United States Patent [19]
Allen, Jr.

[11] 3,901,241
[45] Aug. 26, 1975

[54] DISPOSABLE CRYOSURGICAL INSTRUMENT

[75] Inventor: Robert E. Allen, Jr., Laurel, Md.

[73] Assignee: DU-AL Corporation, Laurel, Md.

[22] Filed: May 31, 1973

[21] Appl. No.: 365,608

[52] U.S. Cl. ............... 128/303.1; 62/293; 141/351
[51] Int. Cl. ........................ A61b 17/36; A61f 7/12
[58] Field of Search................... 62/293; 128/303.1; 141/351; 220/F

[56] References Cited
UNITED STATES PATENTS

| | | | |
|---|---|---|---|
| 3,398,738 | 8/1968 | Lamb et al. | 128/303.1 |
| 3,421,508 | 1/1969 | Nestrock | 128/303.1 |
| 3,434,477 | 3/1969 | Thomas, Jr. | 128/303.1 |
| 3,491,914 | 1/1970 | Elzey | 220/9 F X |
| 3,532,372 | 10/1970 | Stroud | 128/303.1 X |
| 3,536,076 | 10/1970 | Allen, Jr. | 128/303.1 |
| 3,545,432 | 12/1970 | Berman | 128/2.06 E |
| 3,630,203 | 12/1971 | Sellinger et al. | 128/303.1 |
| 3,631,904 | 1/1972 | Mason et al. | 141/351 |
| 3,696,813 | 10/1972 | Wallach | 128/303.1 |
| 3,702,114 | 11/1972 | Zacarian | 128/303.1 |

FOREIGN PATENTS OR APPLICATIONS

| 700,408 | 12/1964 | Canada | 220/9 F |
|---|---|---|---|

*Primary Examiner*—Channing L. Pace
*Attorney, Agent, or Firm*—Griffin, Branigan and Butler

[57] ABSTRACT

A cryosurgical instrument for use in a variety of surgical procedures is provided with a different tip or probe, depending upon the surgical technique contemplated. The instrument has a conical and frusto-conical shape intended to fit the hand of the surgeon, and its rigid wall is made of the inexpensive, self-insulating expanded polystyrene, foamed copolymer of acrylonitrile, butadiene and styrene, foamed polyethylene or foamed polypropylene plastics. The instrument is designed specifically for the purpose of making fluorocarbon compounds Freon 13B1 ($CBrF_3$), Freon 116 ($CF_3$—$CF_3$) and Freon 13 managable for cryosurgical and other medical and therapeutic uses not previously used in the prior arts. The instrument is fed with the cryogenic fluid, which may be liquid nitrogen, nitrous oxide or one of the milder fluorocarbon compounds Freon 11, Freon 12 and Freon 22, in the upright position with the probe pointing upwardly in such a manner that the internal portion of the probe is not brought into contact with the crogenic fluid until the instrument is inverted and readied for use.

3 Claims, 5 Drawing Figures

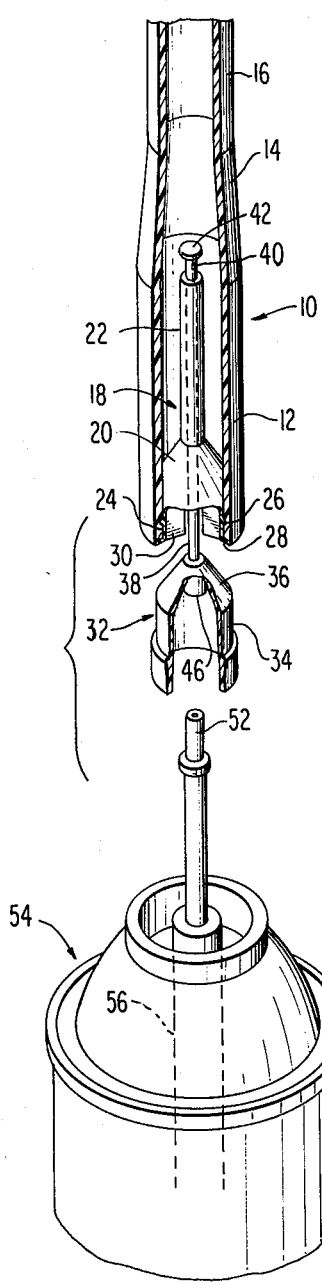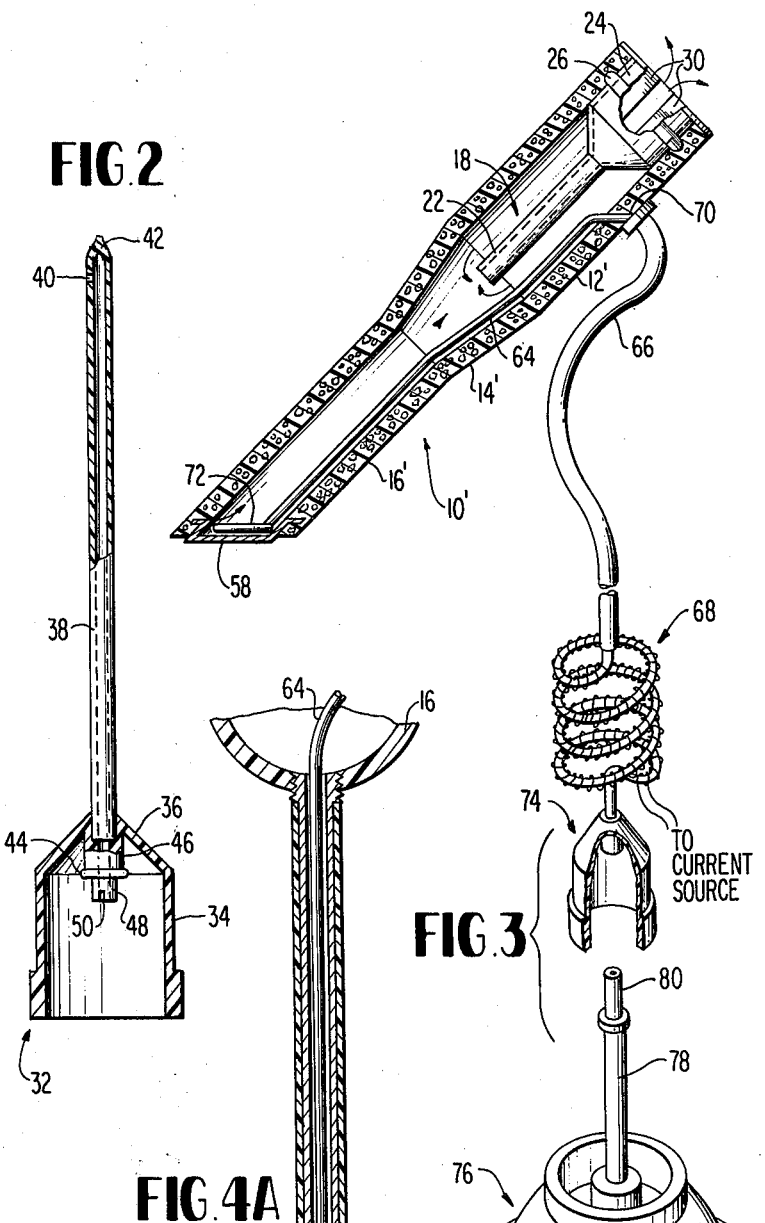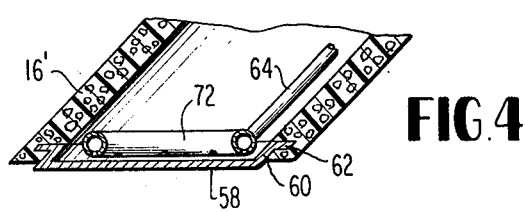

3,901,241

DISPOSABLE CRYOSURGICAL INSTRUMENT

FIELD OF INVENTION

The present invention relates to a surgical instrument and, more particularly, to a compact, inexpensive, easy-to-use, self-contained cryogenic surgical instrument.

BACKGROUND OF THE INVENTION

Cryosurgical techniques have found increasingly widespread use in recent years, primarily in the ophthalmic field, but in other fields, e.g. dermatology, otolaryngology, gynecology, neurosurgery, and proctology as well. Cryogenic surgery is based on the concept of utilizing localized extreme cold as a surgical instrument, e.g. for the destruction of tissue.

The cryosurgical instruments generally comprise a tubular housing having a thermal conducting probe or tip of relatively small size extending from the working end of the instrument. The probe is brought into contact with a cryogenic fluid, such as Freon, liquid nitrogen, nitrous oxide, and/or a mixture of alcohol and dry ice, and the low temperature generated by the cryogenic fluid is conducted to the working end of the probe, thereby cooling it to the desired low temperature, so that the tip may be applied to the surgical area to be treated.

There are, in general, two different classes of cryosurgical instruments presently available. That class which has heretofore reached the greatest development is for specific use in the opthamological field, i.e. cryoextractors for the removal of lenses in cataract surgery. In this regard, one successful cryoextractor is illustratively disclosed in my U.S. Pat. No. 3,536,076. Disposable cryoextractors of this type are highly effective, yet are simple and inexpensive. Unfortunately, the advantages of this type of instrument have not yet entirely successfully been provided in other cryogenic surgical instruments, although such simplified instruments have been suggested.

To the contrary, the second class of cryosurgical instruments, heretofore normally used in all other cryogenic surgical techniques, has utilized relatively complex and expensive equipment; in other words, no simple, inexpensive, disposable instrument has previously been devised which is sufficiently satisfactory in practice to permit its use on a wide scale. Such complex prior devices, such as the Kelman-Shea cryosurgical unit, are difficult to manufacture and comprise cryogenic fluid tanks for nitrous oxide or the like, complex and expensive feeding lines and channels for cryogenic fluid flow and expensive metering equipment and controls. Other prior art cryogenic surgical instruments require complex electronic wiring and/or valves to control cryogenic end effects. Some require attachments between the probe and a source of cryogenic fluid so that connecting lines are necessary. The addition of valves and remote sources of cryogenic fluid increases the cost of the instrument.

Accordingly, such prior devices are expensive and vary in price, but even the least expensive cost on the order of $2,000. The equipment at such price is clearly not disposable and, consequently, the problem of sterilization exists. In addition, the presence of feed lines also detracts from the surgeon's ability to "feel" when performing a critical surgical procedure.

SUMMARY OF THE INVENTION

It is, accordingly, an object of the present invention to obviate the defects of the prior art, such as indicated above.

It is another object of the present invention to provide for improved cryosurgery in a variety of surgical environments.

It is another object of the present invention to provide an improved cryosurgical instrument.

It is another object of the present invention to provide a one-use, disposable, compact, light-weight, self-contained, inexpensive cryosurgical instrument for use in cryosurgical fields beyond ophthamology.

It is another object of the present invention to provide a new and improved cryosurgical system whereby improved control of temperature is provided in the instrument while using very simple, inexpensive and disposable equipment.

These and other objects, as well as advantages and the nature of the invention will be more apparent from the general description, followed by a detailed description of certain embodiments of the invention.

It has now been determined that the major problem standing in the way of the provision of a simple, inexpensive, throwaway cryosurgical instrument, for uses other than extraction of lenses in ophthamological surgery, has been inadequate control of temperature at different stages of the operation while using the prior throw-away cryoinstruments heretofore available. For example, some cryosurgical techniques require lower temperatures than have heretofore been available using Freon 12, which is the conventional cryogenic fluid used today in known disposable cryoextractors. However, the colder cryogenic liquids, such as Freon 13B1, liquid nitrogen, and nitrous oxide, require greater control and have not been successfully used in the disposable devices.

Another problem has involved premature icing of the tip or probe immediately upon feeding of the cryogenic fluid to the disposable cryosurgical instrument. In many surgical techniques, it is essential that the surgeon first locate the tip or probe while it is still warm, in the desired surgical area, before the tip begins to ice. Heretofore, in all procedures, except in ophthamology, this requirement has proved detrimental to usage of disposable instruments and so the disposable cryosurgical instruments contemplated have not been entirely satisfactory.

Another difficulty of previous contemplated disposable cryosurgical instruments has been the desire for the provision of heat upon demand by the surgeon. Both in the successful disposable cryoextractors and the other disposable cryosurgical instruments heretofore contemplated, the only reheating control provided has been the reheating caused by ambient conditions after all the cryogenic fluid has evaporated.

To now provide for the first time a more satisfactory disposable cryosurgical instrument, a number of features have been incorporated into the system. Thus, where colder temperatures than can be provided by Freon 12 are necessary, the disposable cryosurgical instrument is formed of closed cell foam plastic and the cryogenic fluid is preferably Freon 13B1, i.e. $CBrF_3$, which has a boiling temperature of about −57°C., approximately 30° less than the boiling temperature of Freon 12, i.e. $CCl_2F_2$. Also provided is an elongated Freon feeder which directs the Freon into the cryosurgical instrument in a direction such that the probe is not brought into contact with Freon until the cryosurgical instrument is inverted for movement into the surgical area. Heretofore, disposable cryosurgical instruments have been fed in the surgical position which immediately and prematurely causes freezing of the probe.

Also provided internally of the instrument and adjacent the probe is a defrosting tube, designed to feed air or spent Freon gas at ambient temperature to the interior of the instrument adjacent the interior of the probe to defrost the probe where this is necessary. In this regard, an independent housing and heating coil assembly may be provided in conjunction with the defrosting feeder line to supply warm, pressurized spent gas originating from a conventional propellant aerosol can.

For a better understanding of the invention, possible embodiments thereof will now be described with reference to the attached drawing, it being understood that these embodiments are intended to be merely exemplary and in no way limitative.

IN THE DRAWING

FIG. 1 is a partially broken away view showing injection of Freon into a cryosurgical instrument in accordance with the present invention;

FIG. 2 is a partial sectional view of the perisoptictype transfer tube and actuator cap designed to permit the injection of the liquid gas refrigerant into the cryosurgical instrument, shown in FIG. 1;

FIG. 3 is a sectional, partly schematic view of another embodiment of a surgical instrument of the present invention, shown in conjunction with a defrosting system;

FIGS. 4 and 4a are examples of probe or tip shapes for surgical instruments in accordance with the present invention.

DETAILED DESCRIPTION OF EMBODIMENTS

Referring first to FIG. 1, there is shown in exploded position, a cryosurgical instrument 10, as shown in my copending application Ser. No. 138,686, filed Apr. 29, now Pat. No. 3,795,245 dated Mar. 5, 1974 about 5¾ inches long, having an upper cylindrical wall portion 12, an intermediate frustoconical wall portion 14 and a lower cylindrical wall portion 16 which leads to the probe. In the embodiment of FIG. 1, the wall of the cryosurgical instrument 10 is formed, such as by injection molding, of solid plastic, such as polystyrene, polyethylene, polypropylene, polyacetal, polycarbonate resin, nylon, polyester, etc. The major criteria of the plastic are that it be sufficiently inexpensive and inexpensively moldable so that the device will be disposable, and that it preferably be transparent or translucent so that at any given moment it can be visually determined how much cryogenic fluid remains in the device.

Provided at the upper end of the instrument 10 and projecting axially downwardly thereinto is a liquid trap portion 18. The liquid trap portion comprises a frustro conical wall 20 and an essentially cylindrical small-bore wall 22. In the embodiment shown, the trap element 18 is separately molded and then press-fitted within the open top end of the instrument 10, although it should be understood that the elements could be fabricated integrally. To assist in the press-fitting retention, a cylindrical wall portion 24 of the trap 18 carries a bead 26 which bites into the inner surface of the wall 12. A horizontal flange 28 maintains the trap at the correct position within the wall 12. A plurality of elongated fins or guiding flanges 30 project radially inwardly from the wall 24.

It will be seen that in the upright position as shown in FIG. 1 an annular space is defined between the outer wall 12 and the inner walls 20 and 22 of the trap 18. This annular space or well is sufficiently large to retain a quantity of cryogenic fluid sufficient for the intended purpose.

An important part of the present invention is an injection actuator cap and a periscoptic-type transfer tube 32, shown in greater detail in FIG. 2. This device 32, also preferably injection molded of suitable plastic as indicated above, comprises a generally cylindrical wall 34, a conical portion 36 and an elongated periscoptic-type transfer tube 38. As shown in FIG. 2 the elongated transfer tube 38, about 2¾ inches long, may be molded of plastic separate from portions 34 and 36 or, to the contrary, the entire device 32 may be integrally molded from one of the plastics as indicated above.

One of the important features of the present invention is the structure of the transfer tube 38. In the first place, it must be sufficiently long and narrow so that it is capable of extending entirely through the small-bore in the trap wall 22 and project beyond the end thereof so that when the cryogenic liquid is dispersed therethrough, it clears the top of the small-bore wall 22. In the second place, the tube 38 must have its opening 40 directed radially rather than axially. This is very important since, if the opening is directed axially, cryogenic liquid will be projected upwardly and will contact the inner surface of the probe thereby prematurely icing the probe, a condition which must be avoided.

In its preferred form, as shown in FIG. 2, the actuator dispenser cap has a number of other features. Thus, the tube 38 is preferably preformed of extruded narrow gauge tubing and is placed in the injection mold immediately prior to the molding of the cap portion 34, 36; thus, the cap and tube, of the same material, become bonded during the molding of the cap with the tube held in place. The end of the tube is heated and clamped to provide the seal for the tube end and the radial hole or holes 40 are punched or cut through the tube wall. A soft rubber sealing ring 44 is located at the interior of the cap 32 on the interiorly projecting post 46. Extending below the sealing ring 44 is an actuating post extension 48 which meshes with an aerosol can valve. A vent 50 is provided in the actuating post extension 48 which vent 50 is calibrated in depth and width to permit a predetermined flow rate of Freon 11, 12 or 22 while sealing off the aerosol can by means of the rubber ring 44.

Referring back to FIG. 1, the actuator post 46 may be simply a tubular female element adapted to receive a male nozzle 52 of an aerosol can 54 which contains the Freon cryogenic fluid under pressure. In any event, regardless of the mating relationship between the actuator cap 32 and the valve 52 of the aerosol can 54, it is important for purposes of the present invention that the aerosol can be provided with a dip-tube 56 so that the Freon may be dispensed into the instrument 10 with all the elements in an upright position as shown in FIG. 1.

The vertical filling concept of the present invention is an important feature, as mentioned above. Vertical filling with the opening 40 directed radially rather than axially, permits warm application of the surgical instrument, i.e. cooling of the probe is inhibited until the device is inverted to the surgical position. Vertical filling as shown provides a larger reservoir of refrigerant in the annular trap space between the wall 12 and the small-bore element 22. The refrigerant will not spill from the device, even in the case of last-second operation procedure delays, in which case the already filled instrument may be simply laid aside without the probe becoming iced.

Referring to FIG. 3 there is shown a cryosurgical device 10' which differs from the cryosurgical device 10 by having its walls 12', 14' and 16' formed of foamed cellular plastic for greater insulation. The use of the foamed walls is particularly suitable for embodiments for use in surgical procedures where a lower temperature is desirable, and the embodiment 10' finds particular suitability in the utilization of Freon 13B1 which boils at −57.8°C., an optimum cryosurgical temperature for most of the conventional cryosurgical procedures used in dermatology, otolaryngology and gynecology. Preferably, the device 10' is injection molded of closed cell foam plastic that forms an inner and outer skin by means of injection molding with plastics more routinely used in extrusion or cast molding. Among such suitable cellular plastic materials may be mentioned expanded polystyrene, expanded copolymer of acrylonitrile, butadiene and styrene, foamed polyethylene and foamed polypropylene, or mixtures thereof.

Noting FIG. 4 there is seen a probe 58 primarily intended for dermatological surgery. The probe 58 comprises a metal plate, preferably of good heat conductivity such as aluminum, silver, or nickel plated copper, which probe is of circular shape as shown or which has an oval shape (not shown). Preferably the probe 58 is placed in the injection mold and the plastic is formed thereabout to give the construction shown in FIG. 4. In this way, the probe 58, which has a vertical flange 60 and a horizontal flange 62, becomes embedded in the plastic.

FIG. 4A shows an example of a different shaped probe 58'. In this case, the probe 58' is so shaped and designed for use in gynecological surgery. The probe 58' may be formed of the same material as the probe 58, and may also be placed in an injection mold whereby the wall 16 is molded thereabout. However, the probe 58', approx. 5¾ inches long, is preferably made of aluminum or brass tubing threaded at one end so that once it is shielded in an extruded separate tube of expanded polystyrene or foamed polyethylene or the like, it may then be screwed into the base end of the instrument. The cone shaped probe head at the other end, adapted to fit into the female cervix, is preferably either of an anodized aluminum or nickel plated copper and of hollow shaped form.

It will be understood that FIGS. 4 and 4A are exaggerated in size, and that for any given probe shape, many such shapes being known, the instrument walls may be either solid plastic in accordance with FIG. 1 and FIG. 4A, or of foam plastic in accordance with FIG. 3 and FIG. 4. Any elongated probe designed to reach internal areas of the body, whatever the shape, will preferably be hollow as shown in FIG. 4A.

Returning to FIG. 3, it is seen that any of the cryosurgical devices 10 or 10' of the present invention may be equipped with an auxillary defrosting device, such an auxillary defrosting device being of greater importance in certain types of cryogenic surgery. Thus, in accordance with one embodiment, the instrument is equipped with a very thin gauge tube 64 which passes from a hole 70 in the side wall 12 or 12' of the device 10 or 10' to a terminal dispenser 72 which is located adjacent or within the inside of the probe 58 or 58'. In the embodiment of FIG. 4, the dispenser may simply be a doughnutshaped ring with sprinkler holes passing therethrough. At the hole 70 is a plug-in outlet for an external heating device including a warm air transfer tube 66. The warm air tube 66, of gauge equal to the tube 64, in turn passes to a thermostatically controlled tube-type heating coil 68 and then to an actuator cap 74 for a conventional aerosol type can 76 having no dip tube. The aerosol can has a plastic coated brass stem 78 and a brass nozzle 80.

If, during use, it becomes necessary to quickly reheat the probe 58, it is necessary only to actuate the upright aerosol can with the actuator cap 74 whereupon spent propellant in vapor form, which is comparatively warm, will exit from the dispenser 72 thereby warming the probe 58. If greater heat is needed, the heating coil 68 may also be actuated.

In the case of use of a cryogenic surgical instrument 10' having foam-cellular walls, it is desirable that the filling can 54 be provided with a metering valve (not shown). The reason for this is that the foam walls tend to opacify the instrument 10' so that the physician or surgeon cannot visually see how much refrigerant is being loaded into the device. Accordingly, the use of a metering valve permits only a measured, given quantity of the refrigerant to be metered into the annular trap space between wall 22 and wall 12'.

It will be understood that the device of the present invention provides a number of important and significant advantages, and, depending on the shape of the probe, is capable of use in a variety of different environments. Aside from the safety features and the inexpensive and disposable nature of the instrument, it has the following advantages and medical uses.

Medical advantages: no secondary bleeding, no anesthetic needed, minimal pain, no heat radiation, and no acrid odor.

Medical uses: the instrument of the present invention makes cryosurgical and cryotherapy procedures a safe and practical, private office procedure for all problems not requiring general anesthesia and surgical incision of the human body, and without the need for expensive and complex cryosurgical units. With the single exception of gynecology, no change in the surgeons' technique is required. While the instrument of the present invention may be used in hospitals, its primary application is to render cryosurgical and cryotherapeutic treatment as an easy-to-control office procedure, without danger of burns to the physician and necrotization confined to the desired area.

Examples are as follows

Dermatology: superficial skin lesions not responsive to toxic chemotherapy, keloids, hypertrophic scars, hemangiomas, plantar warts and epitheliomas of the skin or mucous membrane may be removed.

Otolaryngology: control of severe nasal bleeding, destruction of diseased tonsils, polyps, hypertrophied adenoids, and shrinkage of the nasal turbinates may be accomplished. Leukoplakia and benign vascular and malignant tumors in the nose, mouth and throat may be removed. The device may be used for treatment of maxillary sinus angiofibroma.

Gynecology: the device may be used in the treatment of cervicitis, dysplasia, atypical hyperplasia and cervical carcinoma.

General surgery: the device may be used for destruction of certain neoplasms and some procedures on the liver and pancreas.

Neurology: tumors, being highly vascularized, may be more readily removed at the surface of the brain by use of the device as a means of retarding bleeding during excision. The device both holds and freezes. It also serves to lift tumor for greater visability of procedure and for removal of excised tumor.

Proctology: the device may be used for polypilectomy and diverticulectomy.

Dental: the device may be used in the testing of teeth for vitality, pulpitis, tooth hypersensitivity and tooth fractures.

From the above, it will be clear that various shaped probes may be provided among which may be mentioned a prostate probe, gynecological probes, a sterilization probe, a rectal probe, a nasal probe, a laryngeal probe, a mouth and throat probe, a dental probe and an ear probe.

The foregoing description of the specific embodiment will so fully reveal the general nature of the invention that others can, by applying current knowledge, readily modify and/or adapt for various applications such specific embodiment without departing from the generic concept, and therefore, such adaptations and modifications should and are intended to be comprehended within the meaning and range of equivalents of the disclosed embodiment. It is to be understood that the phraseology or terminology employed herein is for the purpose of description and not of limitation.

Among the modifications, it may be briefly mentioned that the injection actuator cap 32 and tube 38 may be permanently retained as part of the device, such as by the provision of an enlarged end 42 as shown in FIG. 1; or, as is preferred, the bore of the cylindrical wall will be sufficiently large in comparison with the end 42 so that after filling the instrument 10 or 10', the cap 32 and tube 38 may be removed for use of the instrument as shown in FIG. 3.

It will be obvious to those skilled in the art that various changes may be made without departing from the scope of the invention and the invention is not to be considered limited to what is shown in the drawings and described in the specification.

What is claimed is:

1. In a one-use, throw-away, leak-proof, syringe-type cryosurgical instrument of the type comprising:
  a longitudinal housing forming a cavity therein for holding a cryogenic fluid;
  means to conduct cold from said cavity inside of said housing to the outside thereof at one end of said housing, said means including a surgical probe formed of a thermally conductive material, said means being in contact with said cryogenic fluid on the inside of said housing when said instrument is in its operative position;
  means to trap cryogenic liquid within said housing, said trap means being located at the end of said housing opposite from said probe, said trap means comprising an axially directed internally projecting element having a large opening located at the end of said housing opposite said probe and a small opening located intermediate the two ends of said housing, said trap means having a thin elongated element for defining a large annular trap space thereabout within said cavity, said trap means aiding the insertion of cryogenic fluid within said housing while preventing said cryogenic fluid in liquid form from leaving said housing after said fluid has been inserted therein; and
  actuator cap means for feeding cryogenic liquid into said cavity through said elongated element while disposed in vertical position with said probe projecting upwardly, said actuator cap means comprising a receiver element for mating with the valve of an aerosol can, and a narrow elongated tube of length greater than the length of said thin elongated trap element;
  the improvement wherein a tip portion of said narrow elongated tube which extends beyond said thin elongated trap element into said cavity during cryogenic-liquid feeding has a radially directed opening therein for feeding cryogenic liquid into said housing radially without causing contact of the cryogenic fluid with said thermal conducting means during said feeding.

2. A device in accordance with claim 1 comprising an opening in the side of said housing, a tube passing from said opening in said side to a location adjacent said thermal conducting means, and a dispenser element connected to said tube for dispensing warm gas against said thermal conducting means.

3. In a one-use, throw-away, leak-proof, syringe-type cryosurgical instrument of the type comprising:
  a longitudinal housing forming a cavity therein for holding a cryogenic fluid;
  means to conduct cold from said cavity inside of said housing to the outside thereof at one end of said housing, said means including a surgical probe formed of a thermally conductive material, said means being in contact with said cryogenic fluid inside said cavity when said instrument is in its operative position;
  means to trap cryogenic liquid within said housing, said trap being located at the end of said housing opposite from said probe, said trap means comprising an axially directed internally projecting element having a large opening located at the end of said housing opposite said probe and a small opening located intermediate the two ends of said housing, said trap means having a thin elongated element for defining a large annular trap space thereabout within said housing, said trap means aiding the insertion of cryogenic fluid within said housing while preventing said cryogenic fluid in liquid form from leaving said housing after said fluid has been inserted therein; and
  actuator cap means for feeding cryogenic liquid into said cavity through said elongated element while disposed in vertical position with said probe projecting upwardly, said actuator cap means comprising a receiver element for mating with the valve of an aerosol can, and a narrow elongated tube of length greater than the length of said thin elongated trap element;

the improvement wherein said housing defines an opening in the side thereof, and there is further included a tube passing through said opening in said side into said cavity to a location adjacent to said thermal conducting means and a dispenser element connected to said tube for dispensing warm gas against said thermal conducting means.

* * * * *